(12) United States Patent
Ramsey et al.

(10) Patent No.: US 6,915,362 B2
(45) Date of Patent: Jul. 5, 2005

(54) SYSTEM TO AGGREGATE KEYBOARD VIDEO MOUSE (KVM) CONTROL ACROSS MULTIPLE SERVER BLADE CHASSIS

(75) Inventors: Scott Ramsey, Austin, TX (US); Jil M. Bobbitt, Austin, TX (US)

(73) Assignee: Dell Products L.P., Round Rock, TX (US)

(*) Notice: Subject to any disclaimer, the term of this patent is extended or adjusted under 35 U.S.C. 154(b) by 74 days.

(21) Appl. No.: 10/423,277

(22) Filed: Apr. 25, 2003

(65) Prior Publication Data

US 2004/0215617 A1 Oct. 28, 2004

(51) Int. Cl.$^7$ .......................... G06F 13/10; G06F 13/14; G06F 13/42
(52) U.S. Cl. .............................. 710/62; 710/38; 710/72; 710/73; 710/100; 710/131; 710/316; 710/317; 709/203; 709/209; 709/217; 709/231; 709/226; 709/223; 709/249
(58) Field of Search .......................... 710/316, 62, 38, 710/72, 73, 100, 131, 317, 8–10; 709/223, 249, 203, 209, 217, 231, 226

(56) References Cited

U.S. PATENT DOCUMENTS

| 5,483,250 | A | | 1/1996 | Herrick ........................ 345/32 |
|---|---|---|---|---|
| 5,669,015 | A | | 9/1997 | Chidester et al. ............. 710/73 |
| 5,875,293 | A | | 2/1999 | Bell et al. ..................... 714/27 |
| 5,946,469 | A | | 8/1999 | Chidester ..................... 703/24 |
| 6,112,264 | A | * | 8/2000 | Beasley et al. ............... 710/38 |
| 6,256,014 | B1 | * | 7/2001 | Thomas et al. ............. 345/163 |
| 6,378,009 | B1 | * | 4/2002 | Pinkston et al. ............. 710/62 |
| 6,539,418 | B2 | * | 3/2003 | Schneider et al. .......... 709/203 |
| 6,557,170 | B1 | * | 4/2003 | Wilder et al. ................ 725/130 |
| 6,567,869 | B2 | * | 5/2003 | Shirley ........................ 710/62 |
| 6,609,034 | B1 | * | 8/2003 | Behrens et al. ............... 700/19 |
| 6,671,756 | B1 | * | 12/2003 | Thomas et al. ............... 710/73 |
| 6,672,896 | B1 | * | 1/2004 | Li ............................... 439/502 |
| 6,681,250 | B1 | * | 1/2004 | Thomas et al. ............. 709/226 |
| 6,718,415 | B1 | * | 4/2004 | Chu ............................ 710/301 |
| 2003/0051021 | A1 | * | 3/2003 | Hirschfeld et al. ......... 709/223 |
| 2004/0073712 | A1 | * | 4/2004 | Larson et al. ............... 709/249 |
| 2004/0098532 | A1 | * | 5/2004 | Huang et al. ............... 710/316 |

OTHER PUBLICATIONS

Network Technologies Inc. (NTI), "ST–nXm (Multi-user/Multi-platform KVM Switch)" Installation/User guide, Apr. 13, 1999, pp. 1–26.*

* cited by examiner

Primary Examiner—Tammara Peyton
(74) Attorney, Agent, or Firm—Hamilton & Terrile, LLP; Stephen A. Terrile

(57) ABSTRACT

A system for externally controlling keyboard video monitor (KVM) functions within a server blade architecture. The system includes an external KVM controller and a server blade chassis coupled to the external KVM controller. The server blade chassis includes a server blade and a management module coupled to the server blade. The management module includes an integrated KVM module. The integrated KVM module detects whether the external KVM controller is coupled to the server blade chassis. When the external KVM controller is coupled to the server blade chassis, the integrated KVM module functions as a relay agent between the external KVM controller and the server blade. When the external KVM controller is not coupled to the server blade chassis, the integrated KVM module functions as a master KVM controller for the server blade chassis.

16 Claims, 5 Drawing Sheets

SYSTEM TO AGGREGATE KEYBOARD VIDEO MOUSE (KVM) CONTROL ACROSS MULTIPLE SERVER BLADE CHASSIS

BACKGROUND OF THE INVENTION

1. Field of the Invention

The present invention relates in general to the field of network information handling systems, and more particularly to a system to aggregate keyboard video mouse control across multiple server chassis.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system that provides flexibility in managing network information is a blade server having plural server blades. A blade server is scalable to meet processing requirements for network information by increasing the number of server blades as network processing requirements increase. The server blades are supported in a server chassis and typically interfaced with each other and a network by two managed Ethernet switches per chassis. The deployment of blade servers may include a large number of chassis with each chassis having a number of server blades to process information. For instance, a deployment of blade servers may include 25 chassis in one or more racks with each chassis having several blades interfaced by two Ethernet switches so that the blade server has a total of 50 Ethernet switches capable of interfacing with a network.

On challenge in high density blade servers relates to connecting and cabling keyboard video and mouse control. In such systems, the cabling may be cumbersome due to the many cables used for connection as well as possibly multiple keyboard video mouse (KVM) switches.

A known solution in non-blade type servers daisy chains the servers together to a single keyboard video mouse controller. The controller is located on another server. However, with this solution, if the daisy chain is broken, servers beyond the break may not be accessed.

Another known solution in blade servers implements a remote KVM controller via system management hardware (also referred to as KVM over IP). However, this solution is often costly because a high speed microcontroller as well as an Ethernet interface is used for the implementation. Additionally, this solution may not fit within a small blade form factor.

SUMMARY OF THE INVENTION

In one embodiment, the invention relates to a system for externally controlling keyboard video monitor (KVM) functions within a server blade architecture. The system includes an external KVM controller and a server blade chassis coupled to the external KVM controller. The server blade chassis includes a server blade and a management module coupled to the server blade. The management module includes an integrated KVM module. The integrated KVM module detects whether the external KVM controller is coupled to the server blade chassis. When the external KVM controller is coupled to the server blade chassis, the integrated KVM module functions as a relay agent between the external KVM controller and the server blade. When the external KVM controller is not coupled to the server blade chassis, the integrated KVM module functions as a master KVM controller for the server blade chassis.

In another embodiment, the invention relates to a system for controlling keyboard video monitor (KVM) functions within a server blade architecture. The system includes a KVM controller and a server blade chassis coupled to the KVM controller. The server blade chassis includes a server blade and a management module coupled to the server blade. The management module includes an integrated KVM module. The integrated KVM module detects whether the KVM controller is coupled to the server blade chassis. When the KVM controller is coupled to the server blade chassis, the integrated KVM module functions as a relay agent between the KVM controller and the server blade. When the KVM controller is not coupled to the server blade chassis, the integrated KVM module functions as a master KVM controller for the server blade chassis.

In another embodiment, the invention relates to an information handling system which includes a plurality of server blades, a system for controlling keyboard video monitor (KVM) functions of the plurality of server blades. The system for controlling KVM functions includes a management module coupled to the plurality of server blades. The management module includes an integrated KVM module. The integrated KVM module detects whether an external KVM controller is coupled to the plurality of server blades. When the external KVM controller is coupled to the plurality of server blades, the integrated KVM module functions as a relay agent between the external KVM controller and the plurality of server blades. When the external KVM controller is not coupled to the plurality of server blades, the integrated KVM module functions as a master KVM controller for the plurality of server blades. Each of the plurality of server blades includes a processor and memory coupled to the processor.

In another embodiment, the invention relates to a method of controlling keyboard video monitor (KVM) functions within a server blade. The method includes detecting whether an external KVM controller is coupled to a server blade chassis, operating an integrated KVM module as a relay agent between the external KVM controller and the server blade when the external KVM controller is coupled to the server blade chassis and, operating the integrated KVM module as a master KVM controller for the server blade chassis when the external KVM controller is not coupled to the server blade chassis.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1A:
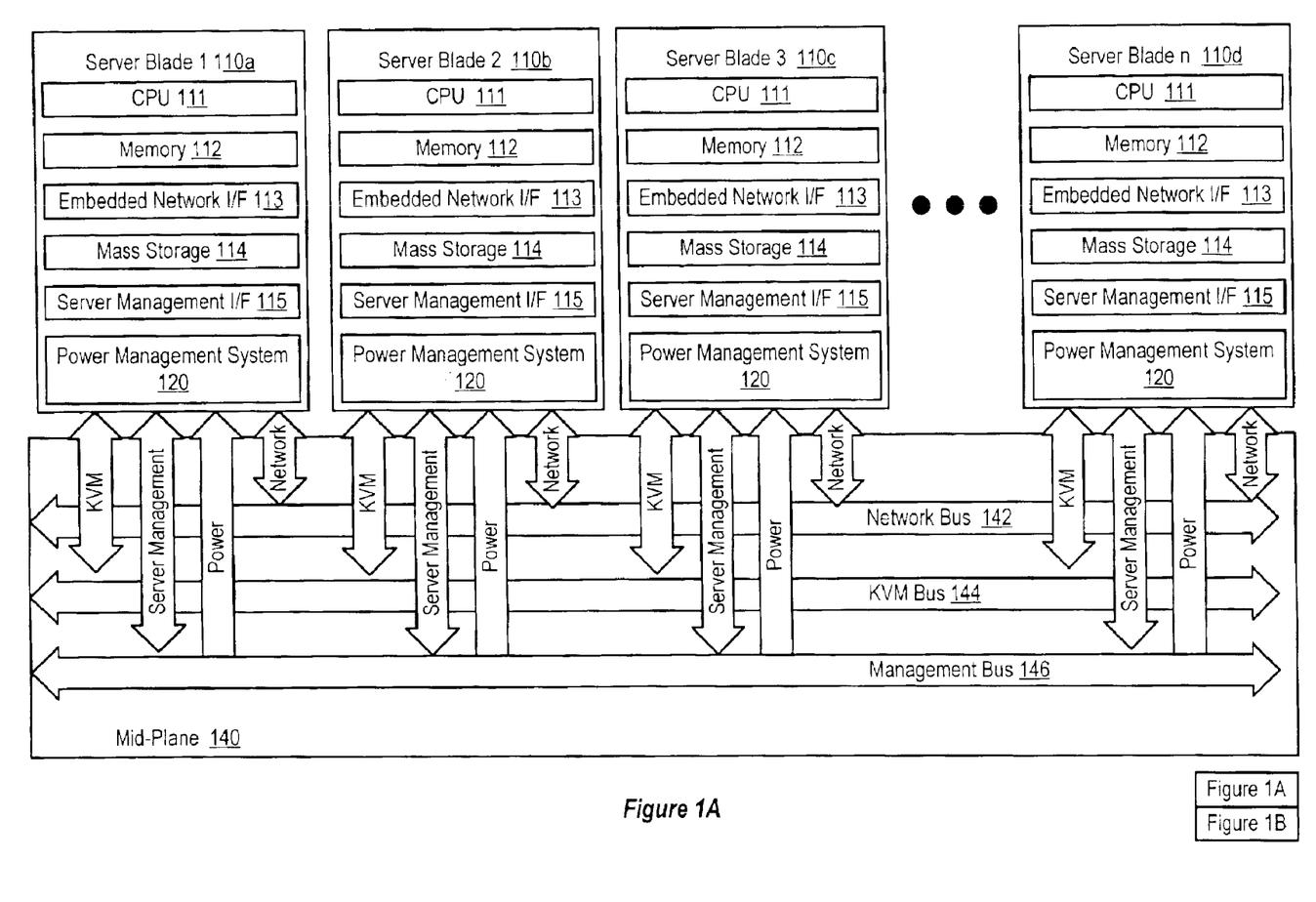
FIGS. 1A and 1B show a schematic block diagram of a server blade platform.
Figure 1B:
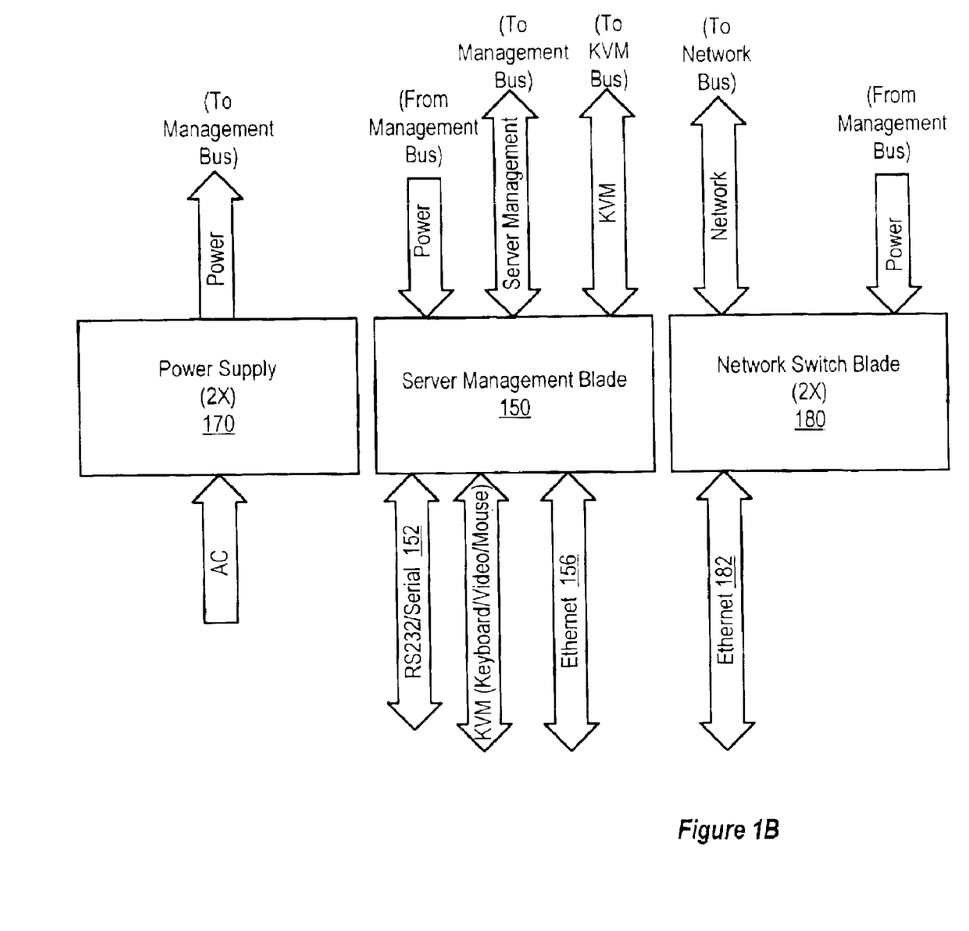

Referring to FIGS. 1A and 1B, a block diagram of a server blade system or chassis 100 is shown. Such a system includes a plurality of sub-systems 110a, 110b, 110c and 110d. Each sub-system 110 is an independent computer system, such as a personal computer or a server blade. Usually only the system boards of these computers or servers are used and placed into a rack or tower system. Every sub-system 110 includes respective components 111, such as a central processing unit (CPU) 112, memory 113, embedded network interface 114, mass storage device 115, and server management interface 116. A keyboard, mouse and monitor is coupled with a keyboard-mouse-monitor managing unit which selectively couples the keyboard-mouse-monitor managing unit with one of the sub-systems (see FIG. 2).

Each server blade 110 may also include a respective server blade power management system 120. Each server blade power management system 120 enables a corresponding server blade 110 to be individually and remotely power on or off. The power management system 120 provides a user with the same effect as a user pushing a mechanical power button located at the front of the server. The functionality of the power management system 120 is compliant with the Microsoft ACPI specification. The ACPI functionality includes remote power on/off, remote hard shutdown and remote hard shutdown/reboot. The behavior of the power management system 120 when receiving the remote button signal depends upon the operating system executing on the server blade 110. When the server blade is executing an operating system that does not support remote shutdown capability, the server blade simply powers off (or powers on) when receiving the remote button signal.

The server blades 110 are coupled to a mid-plane 140 which is located within, e.g., a rack or tower. The mid-plane 140 includes a network bus 142, a keyboard-video-mouse (KVM) bus 144 and a management bus 146. The mid-plane 140 also delivers power to all devices in the chassis. Each server blade 110 is coupled to the mid-plane 140 via these buses.

The server blade system 100 also includes a server management blade 150. The server management blade 150 is coupled to the mid-plane 140 and more specifically to the network bus 142, the KVM bus 144 and the management bus 146. The server management blade 150 also includes a serial port 152, e.g, an RS232 port, a KVM port 154 and an Ethernet port 156.

The server blade chassis 100 also includes a plurality (e.g., two) of power supplies 170 as well as a plurality (e.g., two) of network switch blades 180. The power supplies 170 are coupled to an AC power source and provide power to the server blade system 100 via the management bus 146. The network switch blades 180 are coupled to the network bus 142 and include an Ethernet port 182.

Figure 2:
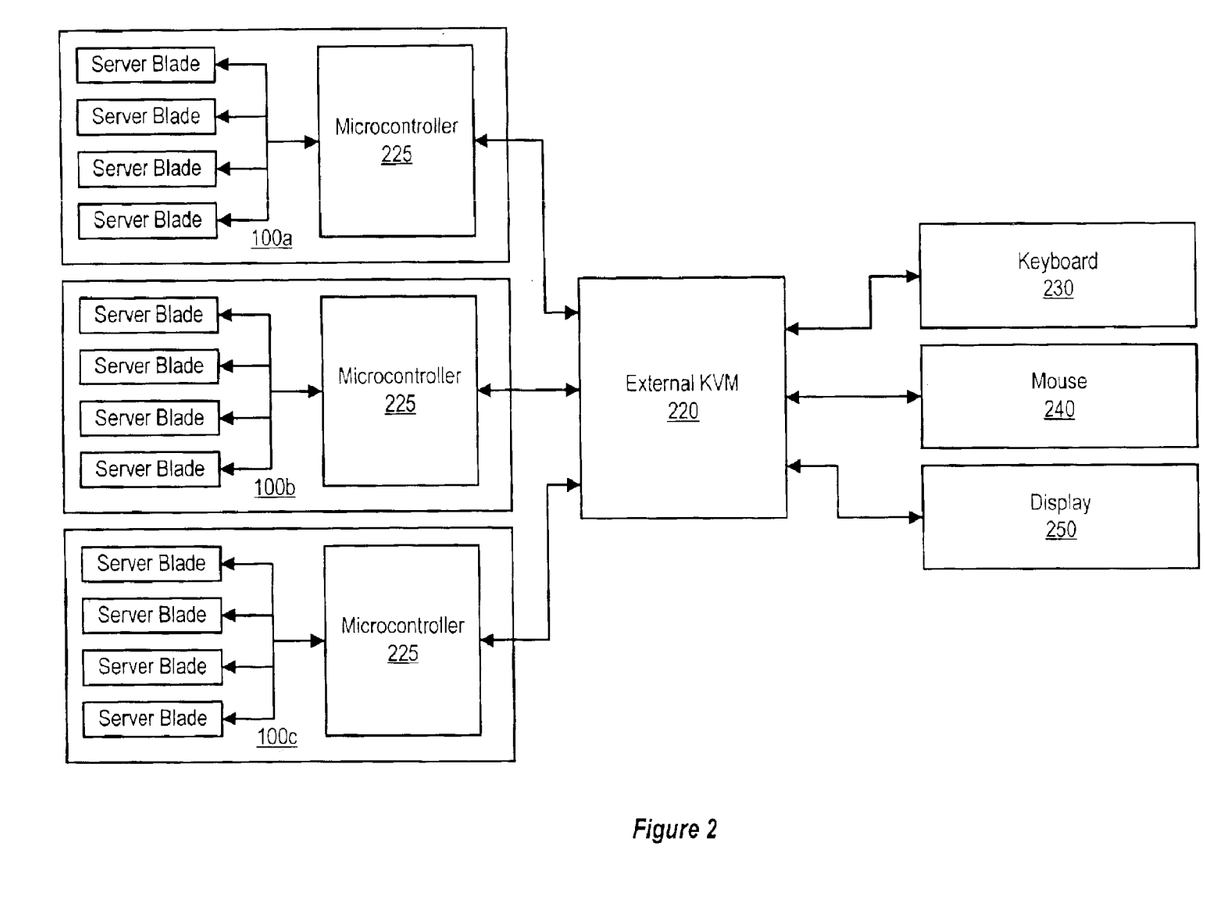
FIG. 2 shows a schematic block diagram of a server blade architecture having an external KVM module.

Referring to FIG. 2, a schematic block diagram of a server blade architecture 200 which includes an external KVM module 220 is shown. More specifically, within the server blade architecture 200, multiple server blade chassis 100 are individually coupled to an external KVM module 220. One example of an external KVM module is a console switch available from Dell Computer Corporation under the trade Designation Dell 2161DS. The external KVM module 220 is in turn coupled to a keyboard 230, a mouse 240 and a display 250. Within each server blade chassis 100, a microcontroller 225 functions as a relay to provide control information between the server blade chassis 100 and the external KVM module 220. The microcontroller 225 of the server blade chassis 100 controls which of the individual blade servers 110 is driving video to the external KVM module 220.

Figure 3:
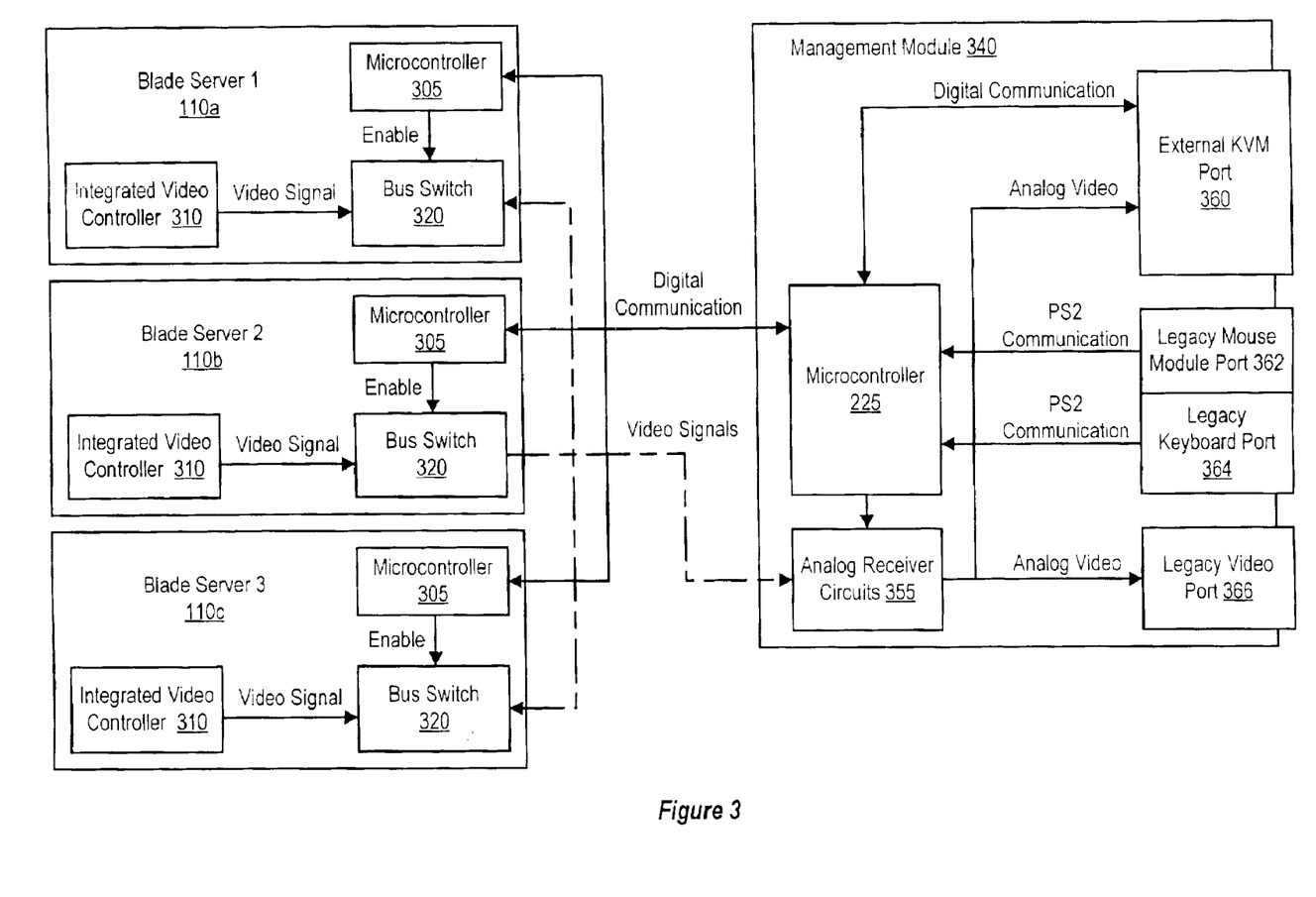
FIG. 3 shows a more detailed schematic block diagram of a server blade architecture having an external KVM module within a server blade management module.

FIG. 3 shows a more detailed schematic block diagram of a server blade chassis architecture for interacting with an external KVM module 220 within a server blade management architecture. More specifically, each blade server 110 includes the microcontroller 305, an integrated video controller 310 and a bus switch 320. The architecture also includes a management module 340, which is in turn coupled to the external KVM 220. The management module 340 is located, for example, within the server management blade 150.

The management module includes the microcontroller 225, analog receiver circuits 355 as well as a plurality of ports. The ports includes an external KVM port 360, a legacy mouse port 362 (e.g., a PS2 mouse port), a legacy Keyboard Port 364 (e.g., a PS2 keyboard port) and a Legacy Video port 366.

The microcontrollers 305 of each of the server blades 110 are coupled to the microcontroller 225 of the management module 340 via a digital communication bus. In a preferred embodiment, the digital communication path is an RS485 communication path; however, the communication path may be any type of digital communication such as an RS232, I2C or SMBUS.

The information that is provided over the digital communication bus includes keyboard and mouse data (such as e.g., PS2 keyboard and mouse data), blade status information and video on and off commands. Because the video bus is shared, only one blade drives video at a time. The microcontroller 225 polls each blade slot to determine which blade is driving video.

The bus switch 320 of each of the server blades 110 are coupled to the analog receiver circuits 355 of the management controller 340 via an analog video communication path. The vide signals are analog red, green and blue as described by the VESA specification. The Video signals may also include extended display identification data (EDID) signals.

In one embodiment, the analog video communication path and the digital communication path are included within a shared bus. However, the digital communication path and the analog video communication may be separate buses or even point to point connections between each blade server and the management module.

The microcontroller 225 of the management module 340 is coupled via a digital communication path to the external KVM port to the external KVM 360. The analog receiver circuits 355 are coupled via an analog video path to the external port 360 and to the legacy video portion 366. The microcontroller 225 is coupled via a legacy mouse communication path to the legacy mouse port 362. The microcontroller 350 is coupled via a legacy keyboard communication path to the legacy keyboard port.

When an external KVM connection is detected by the microcontroller 225, the microcontroller 225 of the management module 340 functions as a relay agent to relay communication commands from an external switch. The commands sent by the external switch include the same information that is provided over the digital communication bus between microcontroller 225 and microcontroller 305 and via the analog communication path between the bus switches of the blades and the analog receiver circuit 355. Because the information is the same, there is no need for additional hardware or software on each blade to implement the external KVM feature.

Figure 4:
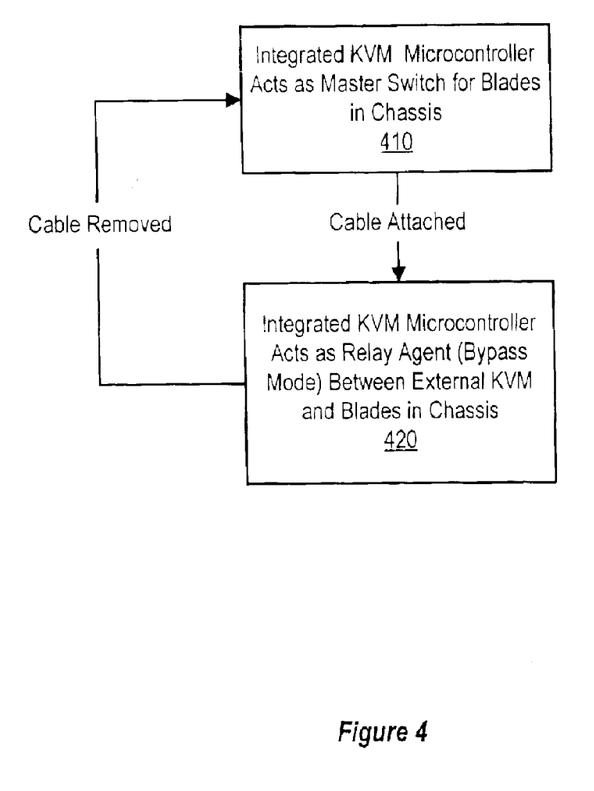
FIG. 4 shows a schematic block diagram of a state machine for a microcontroller of a management module.

Referring to FIG. 4, a schematic block diagram of a state machine for the microcontroller 225 of the management module 340 is shown. Among other known functions, the microcontroller 225 functions as an integrated KVM module for the blade server chassis. More specifically, as shown by state 410, when the external KVM cable is removed, the integrated KVM module of the management module 340 functions as a master switch (i.e., as a master KVM controller) for blades that are within the server chassis. When the integrated KVM module is functioning as a master KVM controller the communication is via the legacy keyboard port 362, the legacy mouse port 364 and the legacy video port 366.

As shown by state 420, when an external KVM cable is attached to the external KVM portion 360, the integrated KVM module of the management module 340 functions as a relay agent, i.e., functions in a bypass mode, between the external KVM module and the blades 110 within the chassis 100. The integrated KVM module continually monitors the external KVM port 360 to determine whether the management module 340 is coupled to an external KVM module 220.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration and equivalents in form and function as will occur to those ordinarily skilled in the pertinent arts. The depicted and described embodiments are examples only, and are not exhaustive of the scope of the invention.

For example, while three server blades 110 are shown, any number of server blades are contemplated. Also, while three server chassis 100 are shown, an number of server chassis are contemplated. Also, while the server chassis are shown individually coupled to the external KVM (i.e., as a point to point connection), a common connection is also contemplated (i.e., as a circuit switching connection).

Also, while an external KVM controller is described, any other cable detection mechanism which would switch between the management card communicating with the server blades or another KVM controller may be used. Such an arrangement physically disconnects the management card microcontroller from the KVM bus when the other KVM controller is attached. Alternatively, the KVM bus may be configured as a multimaster bus. Thus, when an external KVM controller is attached, either the KVM controller on the management module or the external KVM controller switch can send commands to the server blades.

Also, it will be appreciated that a microcontroller may be any type of processor or computing device.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for externally controlling keyboard video monitor (KVM) functions within a server blade architecture comprising:
   an external KVM controller;
   a server blade chassis coupled to the external KVM controller, the server blade chassis comprising
      a server blade; and
      a management module coupled to the server blade, the management module including an integrated KVM module, the integrated KVM module detecting whether the external KVM controller is coupled to the server blade chassis, when the external KVM controller is coupled to the server blade chassis, the integrated KVM module functioning as a relay agent between the external KVM controller and the server blade and when the external KVM controller is not coupled to the server blade chassis, the integrated KVM module functioning as a master KVM controller for the server blade chassis, a legacy keyboard port coupled to the integrated KVM module; and, a legacy mouse port coupled to the integrated KVM module, the integrated KVM module communicating with a keyboard via the legacy keyboard port and with a mouse via the legacy mouse part when the integrated KVM module is functioning as the master KVM controller.

2. The system of claim 1 wherein the management module includes an external KVM port, the external KVM controller being coupled to the integrated KVM controller via the external KVM port.

3. A system for externally controlling keyboard video monitor (KVM) functions within a server blade architecture comprising:

an external KVM controller;

a server blade chassis coupled to the external KVM controller, the server blade chassis comprising a server blade; and a management module coupled to the server blade, the management module including an integrated KVM module, the integrated KVM module detecting whether the external KVM controller is coupled to the server blade chassis, when the external KVM controller is coupled to the server blade chassis, the integrated KVM module functioning as a relay agent between the external KVM controller and the server blade and when the external KVM controller is not coupled to the server blade chassis, the integrated KVM module functioning as a master KVM controller for the server blade chassis, and analog receiver circuits coupled to the server blade and to the integrated KVM module, the analog receiver circuits receiving video signals from the server blade.

4. The system of claim 3 wherein the management module includes an external KVM port, the external KVM controller being coupled to the analog receiver circuits via the external KVM port.

5. The system of claim 3 wherein the management module includes a legacy video port coupled to the analog receiver circuits, the analog receiver circuits communicating with a display via the legacy video port when the integrated KVM module is functioning as the master KVM controller.

6. A system for controlling keyboard video monitor (KVM) functions within a server blade architecture comprising:

a KVM controller;

a server blade chassis coupled to the KVM controller, the server blade chassis comprising a server blade; and a management module coupled to the server blade, the management module including an integrated KVM module, the integrated KVM module detecting whether the KVM controller is coupled to the server blade chassis, when the KVM controller is coupled to the server blade chassis, the integrated KVM module functioning as a relay agent between the KVM controller and the server blade and when the KVM controller is not coupled to the server blade chassis, the integrated KVM module functioning as a master KVM controller for the server blade chassis; and, a legacy keyboard port coupled to the integrated KVM module; and a legacy mouse port coupled to the integrated KVM module, the integrated KVM module communicating with a keyboard via the legacy keyboard port and with a mouse via the legacy mouse port when the integrated KVM module is functioning as the master KVM controller.

7. The system of claim 6 wherein the management module includes a KVM port, the KVM controller being coupled to the integrated KVM controller via the KVM port.

8. A system for controlling keyboard video monitor (KVM) functions within a server blade architecture comprising:

a KVM controller;

a server blade chassis coupled to the KVM controller, the server blade chassis comprising a server blade; and a management module coupled to the server blade, the management module including an integrated KVM module, the integrated KVM module detecting whether the KVM controller is coupled to the server blade chassis, when the KVM controller is coupled to the server blade chassis, the integrated KVM module functioning as a relay agent between the KVM controller and the server blade and when the KVM controller is not coupled to the server blade chassis, the integrated KVM module functioning as a master KVM controller for the server blade chassis; and, analog receiver circuits coupled to the server blade and to the integrated KVM module, the analog receiver circuits receiving video signals from the server blade.

9. The system of claim 8 wherein the management module includes a KVM port, the KVM controller being coupled to the analog receiver circuits via the KVM port.

10. The system of claim 8 wherein the management module includes a legacy video port coupled to the analog receiver circuits, the analog receiver circuits communicating with a display via the legacy video port when the integrated KVM module is functioning as the master KVM controller.

11. An information handling system comprising:

a plurality of server blades, each of the plurality of server blades including a processor; and, memory coupled to the processor;

a system for controlling keyboard video monitor (KVM) functions of the plurality of server blades, the system for controlling KVM functions including a management module coupled to the plurality of server blades, the management module including
an integrated KVM module, the integrated KVM module detecting whether an external KVM controller is coupled to the plurality of server blades, when the external KVM controller is coupled to the plurality of server blades, the integrated KVM module functioning as a relay agent between the external KVM controller and the plurality of server blades and when the external KVM controller is not coupled to the plurality of server blades, the integrated KVM module functioning as a master KVM controller for the plurality of server blades;
a legacy keyboard port coupled to the integrated KVM module; and,
a legacy mouse port coupled to the integrated KVM module, the integrated KVM module communicating with a keyboard via the legacy keyboard port and with a mouse via the legacy mouse port when the integrated KVM module is functioning as the master KVM controller.

12. The information handling system of claim 11 wherein the management module includes
an external KVM port, the external KVM controller being coupled to the integrated KVM controller via the external KVM port.

13. An information handling system comprising:
a plurality of server blades, each of the plurality of server blades including
a processor; and,
memory coupled to the processor;
a system for controlling keyboard video monitor (KVM) functions of the plurality of server blades, the system for controlling KVM functions including
a management module coupled to the plurality of server blades, the management module including
an integrated KVM module, the integrated KVM module detecting whether an external KVM controller is coupled to the plurality of server blades, when the external KVM controller is coupled to the plurality of server blades, the integrated KVM module functioning as a relay agent between the external KVM controller and the plurality of server blades and when the external KVM controller is not coupled to the plurality of server blades, the integrated KVM module functioning as a master KVM controller for the plurality of server blades; and,
analog receiver circuits coupled to the server blade and to the integrated KVM module, the analog receiver circuits receiving video signals from the server blade.

14. The information handling system of claim 13 wherein the management module includes
an external KVM port, the external KVM controller being coupled to the analog receiver circuits via the external KVM port.

15. The information handling system of claim 13 wherein the management module includes
a legacy video port coupled to the analog receiver circuits, the analog receiver circuits communicating with a display via the legacy video port when the integrated KVM module is functioning as the master KVM controller.

16. A method of controlling keyboard video monitor (KVM) functions within a server blade comprising:
detecting whether an external KVM controller is coupled to a server blade chassis,
operating an integrated KVM module as a relay agent between the external KVM controller and the server blade when the external KVM controller is coupled to the server blade chassis; and,
operating the integrated KVM module as a master KVM controller for the server blade chassis when the external KVM controller is not coupled to the server blade chassis; and
receiving video signals from the server blade via analog circuits coupled to the server blade and the integrated KVM module.

* * * * *